United States Patent
Chiang et al.

(10) Patent No.: US 11,533,118 B2
(45) Date of Patent: Dec. 20, 2022

(54) SYNCHRONIZATION SIGNAL BLOCK RASTER SHIFT IN MOBILE COMMUNICATIONS

(71) Applicant: MediaTek Inc., Hsinchu (TW)

(72) Inventors: Mingchun Chiang, Hsinchu (TW); Fucheng Wang, San Jose, CA (US); Tsang-Wei Yu, Hsinchu (TW); Jun Ma, San Jose, CA (US); Tao Chen, Beijing (CN); Wen Yang Chou, Hsinchu (TW)

(73) Assignee: MediaTek Inc.

( * ) Notice: Subject to any disclaimer, the term of this patent is extended or adjusted under 35 U.S.C. 154(b) by 24 days.

(21) Appl. No.: 17/096,382

(22) Filed: Nov. 12, 2020

(65) Prior Publication Data

US 2021/0067262 A1  Mar. 4, 2021

Related U.S. Application Data

(63) Continuation of application No. 16/328,723, filed as application No. PCT/CN2019/075574 on Feb. 20, 2019, now Pat. No. 10,868,626.

(Continued)

(51) Int. Cl.
*H04J 11/00* (2006.01)
*H04W 48/16* (2009.01)

(52) U.S. Cl.
CPC ......... *H04J 11/0069* (2013.01); *H04W 48/16* (2013.01)

(58) Field of Classification Search
CPC .............. H04B 1/70735; H04W 48/16; H04W 56/005; H04W 56/006
See application file for complete search history.

(56) References Cited

U.S. PATENT DOCUMENTS 10,772,054 B2 * 9/2020 Jung .................... H04W 56/006
10,868,626 B2 * 12/2020 Chiang .................. H04W 48/16
(Continued)

FOREIGN PATENT DOCUMENTS

WO  WO 2017118778 A1  7/2017
WO  WO-2017123405 A1 * 7/2017 ........... H04L 5/0044
(Continued)

OTHER PUBLICATIONS

N. Nishant et al., "Efficient Protocol to Optimize New Radio Frequency Scanning in 5G Network," 2021 IEEE 4th 5G World Forum (5GWF), 2021, pp. 52-57, doi: 10.1109/5GWF52925.Oct.2021.00017. (Year: 2021).*

(Continued)

*Primary Examiner* — William D Cumming
(74) *Attorney, Agent, or Firm* — Han IP PLLC; Andy M. Han

(57) ABSTRACT

Various examples with respect to synchronization signal block (SSB) raster shift in mobile communications are described. A processor of a user equipment (UE) performs an initial cell search to identify a cell among one or more cells of a wireless communication system. The processor then camps on the identified cell. In performing the initial cell search, the processor scans through a plurality of SSB entries for frequency bands below 3 GHz with a SSB raster spacing and a SSB raster offset frequency that support sub-carrier spacing (SCS) spaced channel raster and 100 kHz channel raster for both 15 kHz SCS and 30 kHz SCS. A minimum channel bandwidth at 5 MHz or higher for 15 kHz SCS or at 10 MHz or higher for 30 kHz SCS is supported. The SSB raster spacing is a common multiple of 15 kHz and 100 kHz. The SSB raster offset frequency for 100 kHz channel raster is a multiple of 30 kHz plus/minus 10 kHz.

17 Claims, 4 Drawing Sheets

Related U.S. Application Data

(60) Provisional application No. 62/633,117, filed on Feb. 21, 2018.

(56) References Cited

U.S. PATENT DOCUMENTS

| | | | | |
|---|---|---|---|---|
| 11,337,169 | B2* | 5/2022 | Jung | H04W 56/0005 |
| 2016/0374035 | A1* | 12/2016 | Wang | H04W 56/0015 |
| 2017/0078991 | A1 | 3/2017 | Chae et al. | |
| 2020/0228222 | A1* | 7/2020 | Chiang | H04W 48/16 |
| 2020/0280942 | A1* | 9/2020 | Jung | H04J 11/0069 |
| 2021/0067262 | A1* | 3/2021 | Chiang | H04L 5/0007 |

FOREIGN PATENT DOCUMENTS

| | | | | | |
|---|---|---|---|---|---|
| WO | WO-2019050197 | A1 * | 3/2019 | | H04J 11/0069 |
| WO | WO-2019138075 | A1 * | 7/2019 | | H04B 1/70735 |

OTHER PUBLICATIONS

J. Y. Han, O. Jo and J. Kim, "Exploitation of Channel-Learning for Enhancing 5G Blind Beam Index Detection," in IEEE Transactions on Vehicular Technology, vol. 71, No. 3, pp. 2925-2938, Mar. 2022, doi: 10.1109/TVT.2021.3140019. (Year: 2022).*

N. Nishant et al., "Efficient Protocol to Optimize New Radio Frequency Scanning in 5G Network," 2021 IEEE 4th 5G World Forum (5GWF), 2021, pp. 52-57, doi: 10.1109/5GWF52925.2021.00017. (Year: 2021).*

European Patent Office, Extended European Search Report for European Patent Application No. 19757408.0, dated Oct. 5, 2021.

China National Intellectual Property Administration, First Office Action for China Patent Application No. 201980001017.X, dated Sep. 10, 2021.

ZTE Corporation et al., "Considerations on NR Sync Raster Shift", 3GPP TSG-RAN WG4 Meeting #86, R4-1801519, Athens, Greece, Feb. 26-Mar. 2, 2018.

CATT, "Summary of Offline Discussion on RMSI", 3GPP TSG RAN WG1 Meeting #93, R1-1807692, Busan, Korea, May 21-25, 2018.

Ericsson, "WF on sync raster for NR", 3GPP TSG-RAN WG4 #86bis, R4-1805980, Melbourne, Australia, Apr. 16-20, 2018.

Mediatek Inc., "NR SS raster shift for 100kHz channel raster", 3GPP TSG-RAN WG4 Meeting #86, R4-1802280, Athens, Greece, Feb. 26-Mar. 2, 2018.

ZTE Corporation, "NR channel raster", 3GPP TSG-RAN WG4 Meeting #86, R4-1712765, Reno, USA, Nov. 27-Dec. 2, 2017.

China National Intellectual Property Administraion, Notice of Allowance for China Patent Application No. 201980001017.X, dated Apr. 6, 2022.

* cited by examiner

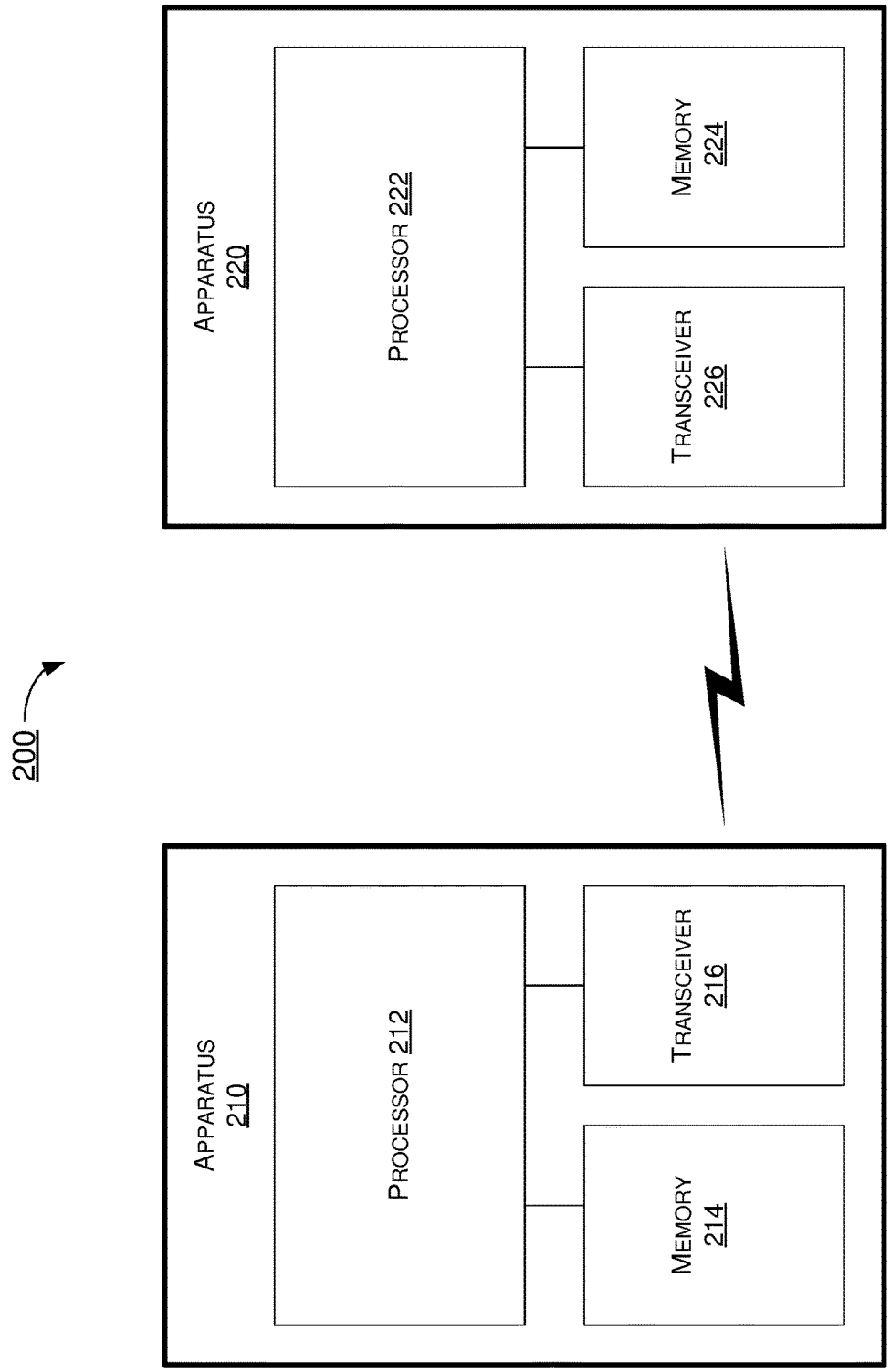

300

---

PERFORM, BY A PROCESSOR OF A USER EQUIPMENT (UE), AN INITIAL CELL SEARCH TO IDENTIFY A CELL AMONG ONE OR MORE CELLS OF A WIRELESS COMMUNICATION SYSTEM
310

SCAN THROUGH A PLURALITY OF SYNCHRONIZATION SIGNAL BLOCK (SSB) ENTRIES THAT ARE MATHEMATICALLY EXPRESSED AS:

N * (900kHz) + M * (OkHz) + 150kHz

- A VALUE OF N RANGES BETWEEN 1 AND 3333,
- A VALUE OF M IS 0 FOR A SUB-CARRIER SPACING (SCS) SPACED CHANNEL RASTER OR ONE OF -1, 0 AND 1 FOR A 100kHz CHANNEL RASTER, AND
- A VALUE OF O IS ONE OF 70, 80, 100, 110, 130, 140, 160, 170, 190, 200, 220, 230, 250, 260, 280 AND 290

315

CAMP, BY THE PROCESSOR, ON THE IDENTIFIED CELL
320

PERFORM, BY A PROCESSOR OF A USER EQUIPMENT (UE), AN INITIAL CELL SEARCH TO IDENTIFY A CELL AMONG ONE OR MORE CELLS OF A WIRELESS COMMUNICATION SYSTEM
410

SCAN THROUGH A PLURALITY OF SYNCHRONIZATION SIGNAL BLOCK (SSB) ENTRIES FOR FREQUENCY BANDS BELOW 3GHZ WITH A SSB RASTER SPACING AND A SSB RASTER OFFSET FREQUENCY SATISFYING A PLURALITY OF REQUIREMENTS INCLUDING:

- SUPPORT FOR BOTH A SUB-CARRIER SPACING (SCS) SPACED CHANNEL RASTER AND A 100KHZ CHANNEL RASTER,
- SUPPORT FOR BOTH 15KHZ SCS AND 30KHZ SCS,
- A MINIMUM CHANNEL BANDWIDTH (CBW) AT 5MHZ OR HIGHER FOR 15KHZ SCS OR AT 10MHZ OR HIGHER FOR 30KHZ SCS,
- THE SSB RASTER SPACING BEING A COMMON MULTIPLE OF 15KHZ AND 100KHZ, AND
- THE SSB RASTER OFFSET FREQUENCY FOR THE 100KHZ CHANNEL RASTER BEING A MULTIPLE OF 30KHZ PLUS OR MINUS 10KHZ

415

---

CAMP, BY THE PROCESSOR, ON THE IDENTIFIED CELL
420

FIG. 4

SYNCHRONIZATION SIGNAL BLOCK RASTER SHIFT IN MOBILE COMMUNICATIONS

CROSS REFERENCE TO RELATED PATENT APPLICATION(S)

The present disclosure is a continuation of U.S. patent application Ser. No. 16/328,723, filed on 27 Feb. 2019, which is a part of U.S. national stage of international patent application PCT/CN2019/075574, filed on 20 Feb. 2019, which claims the priority benefit of U.S. Patent Application No. 62/633,117, filed on 21 Feb. 2018. Contents of aforementioned applications are herein incorporated by reference in their entirety.

TECHNICAL FIELD

The present disclosure is generally related to mobile communications and, more particularly, to synchronization signal block raster shift in mobile communications.

BACKGROUND

Unless otherwise indicated herein, approaches described in this section are not prior art to the claims listed below and are not admitted as prior art by inclusion in this section.

Synchronization signal block (SSB) refers to the downlink signal required for a user equipment (UE) to camp on a Long-Term Evolution (LTE) or a 5th-Generation (5G) New Radio (NR) mobile communication network in an initial cell search and access process. During the initial cell search, the UE usually scans through all SSB locations (e.g., raster scan) in available frequency bands to identify an accessible cell on which to camp. The amount of time spent on the initial cell search typically depends on the number of SSB raster to be scanned. In LTE, the SSB raster is aligned with channel raster at a 100 kHz grid, with a SSB size of 6 physical resource blocks (PRBs). In 5G NR, with a SSB size of 20 PRBs, it is desirable to minimize the number of SSB raster in order to reduce the initial cell search time.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a UE performing an initial cell search to identify a cell among one or more cells of a wireless communication system. The method may also involve the processor camping on the identified cell. In performing the initial cell search, the method may involve the processor scanning through a plurality of SSB entries that are mathematically expressed as $N*(900 kHz)+M*(OkHz)+150 kHz$. A value of N may range between 1 and 3333. A value of M may be 0 for a sub-carrier spacing (SCS) spaced channel raster or one of −1, 0 and 1 for a 100 kHz channel raster. A value of O may be one of 70, 80, 100, 110, 130, 140, 160, 170, 190, 200, 220, 230, 250, 260, 280 and 290.

In one aspect, a method may involve a processor of a UE performing an initial cell search to identify a cell among one or more cells of a wireless communication system. The method may also involve the processor camping on the identified cell. In performing the initial cell search, the method may involve the processor scanning through a plurality of SSB entries for frequency bands below 3 GHz with a SSB raster spacing and a SSB raster offset frequency satisfying a plurality of requirements including: (a) support for both a SCS spaced channel raster and a 100 kHz channel raster, (b) support for both 15 kHz SCS and 30 kHz SCS, (c) a minimum channel bandwidth (CBW) at 5 MHz or higher for 15 kHz SCS or at 10 MHz or higher for 30 kHz SCS, (d) the SSB raster spacing being a common multiple of 15 kHz and 100 kHz, and (e) the SSB raster offset frequency for the 100 kHz channel raster being a multiple of 30 kHz plus or minus 10 kHz.

It is noteworthy that, although description provided herein may be in the context of certain radio access technologies, networks and network topologies such as 5G NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram of an example wireless communication system in accordance with an implementation of the present disclosure.

FIG. 3 is a flowchart of an example process in accordance with an implementation of the present disclosure.

FIG. 4 is a flowchart of an example process in accordance with an implementation of the present disclosure.

DETAILED DESCRIPTION OF PREFERRED IMPLEMENTATIONS

Figure 1:
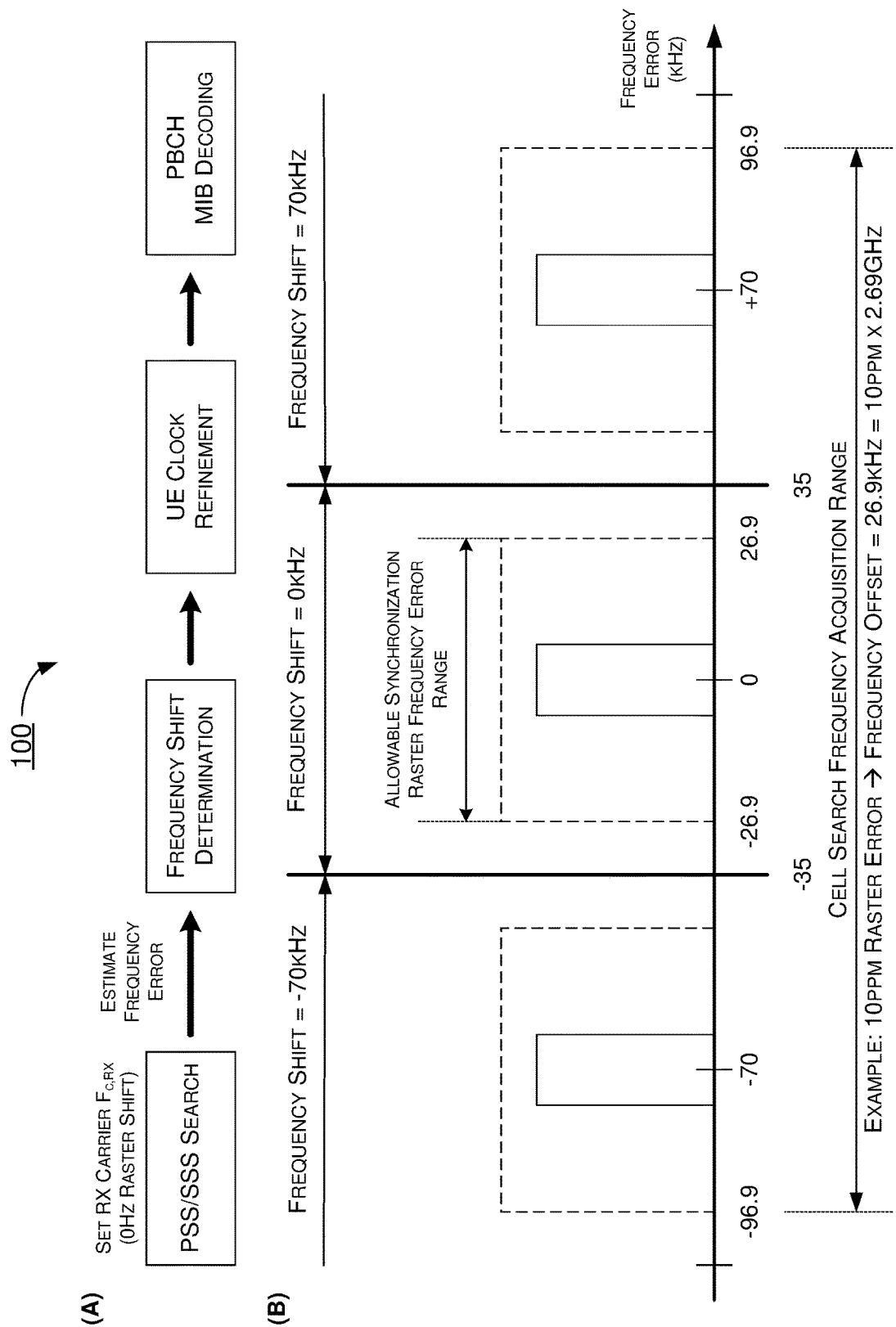
FIG. 1 is a diagram of an example scenario in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In order to minimize the SSB raster number in 5G NR, the SSB raster does not need to be aligned with channel raster such that the raster frequency spacing can be maximized. Accordingly, as a constraint for defining 5G NR raster, there should be at least one SSB raster within any minimum channel bandwidth (CBW) where the SSB is fully confined within the corresponding transmission bandwidth (TBW). Moreover, as another constraint for defining 5G NR raster, a frequency difference between the SSB raster and channel raster should be a multiple of sub-carrier spacing (SCS).

According to the $3^{rd}$-Generation Partnership Project (3GPP) specification, the global SSB raster was originally defined as (N*900 kHz+M*5 kHz) in absolute frequency where M=(-1, 1) is introduced as the entry set besides N*900 kHz in order to support both SCS-spaced channel raster and 100 kHz channel raster for LTE re-farmed bands less than 2.4 GHz. It is noteworthy that 5 kHz is not the only offset which can satisfy the sub-carrier alignment for SSB and 100 kHz channel raster. Mathematically, any multiple of 15 kHz plus or minus 5 kHz would fulfill the requirement, such as the following offset values (in kHz): 5, 10, 20, 25, 35, 40, 50, 55, 65, 70, 80, 85, 95, 100, 110, 115, 125, 130, 140, 145, 155, 160, 170, 175, 185, 190, 200, 205, 215, 220, 230, 235, 245, 250, 260, 265, 275, 280 and 290. In the interest of brevity, values equal to or greater than 300 kHz are not listed.

It is noteworthy that frequencies in close proximity of the three SSB entries around N*900 kHz may cause ambiguity as whether a measured frequency offset is a result of UE reference clock inaccuracy or due to actual SSB entry frequency offset in case that M value would not be signaled by the network. In an existing approach, to mitigate aforementioned frequency offset ambiguity, remaining minimum system information (RMSI) signaling is relied on to differentiate the raster frequency shift. However, downside effects of such approach include signaling overhead and potential timing effort in RMSI decoding (e.g., up to 10 ppm timing error for a 1 GHz carrier). Besides, this approach does not support 30 kHz SCS.

Under a proposed scheme in accordance with the present disclosure, SSB raster spacing and offset for 5G NR may be defined as the frequency separation between adjacent primary SSB raster entries, not including offset entries, in such a way that SSB raster spacing is maximized in order to minimize the number of SSB raster entries so as to reduce initial cell search time. For instance, the SSB raster spacing and offset under the proposed scheme may be for frequency bands below 3 GHz. Additionally, the SSB raster spacing and offset may support both SCS-spaced channel raster and 100 kHz channel raster as well as both 15 kHz and 30 kHz SCSs. Moreover, the SSB raster spacing and offset may be with minimum channel bandwidth at 5 MHz or higher for 15 kHz SCS and at 10 MHz or higher for 30 kHz SCS.

Under the proposed scheme, the SSB raster spacing may be a common multiples of 15 kHz and 100 kHz such as, for example and without limitation, 300 kHz, 600 kHz, 900 kHz, 1200 kHz, and so on. Under the proposed scheme, the maximum raster spacing may be estimated and mathematically expressed as follows:

$$(\text{TBW of the minimum CBW}) - (\text{SSB size})$$

For instance, for a minimum CBW at 5 MHz, the raster spacing may be chosen as 900 kHz.

Under the proposed scheme, for SCS spaced channel raster, SSB offset entries may be unnecessary. On the other hand, for 100 kHz channel raster with either 15 kHz SCS or 30 kHz SCS, the offset frequency may be any multiple of 30 kHz plus or minus 10 kHz (30 kHz+/-10 kHz) such as, for example and without limitation, 20 kHz, 40 kHz, 50 kHz, 70 kHz, 80 kHz, 100 kHz, and the like. Under the proposed scheme, the minimum raster offset may be higher than or greater than two times of a highest frequency offset caused by inaccuracy in a reference clock. For instance, assuming a typical uncalibrated crystal frequency offset is up to +/-10 ppm, a potential carrier frequency offset at 3 GHz may then be up to 30 kHz. In such case, under the proposed scheme, the minimum raster offset would be greater than 60 kHz.

Moreover, under the proposed scheme, the maximum raster offset may be lower than or less than one third (⅓) of the raster spacing. For instance, the maximum raster offset would be less than 300 kHz for a raster spacing of 900 kHz. It is noteworthy that a smaller raster offset may be desirable for lower complexity in hardware implementation as well as reduced cell search time.

Under the proposed scheme, SSB entries for 5G NR frequency bands below 3 GHz may be mathematically expressed in Formula (1) as follows:

$$N*(900 \text{ kHz}) + M*(O \text{kHz}) + 150 \text{ kHz}$$

In Formula (1), the value of N may range between 1 and 3333. The value of M may be 0 for SCS spaced channel raster or one of the values of {-1, 0, 1} for 100 kHz channel raster (e.g., for LTE). The value of O may be one of the following values: 70, 80, 100, 110, 130, 140, 160, 170, 190, 200, 220, 230, 250, 260, 280 and 290.

FIG. 1 illustrates an example scenario 100 in accordance with an implementation of the present disclosure. Scenario 100 may pertain to SSB raster shift in mobile communications during an initial cell search and access process performed by a UE. In scenario 100, as shown in part (A) of FIG. 1, during the cell search process, the UE may perform a number of operations. For instance, the UE may perform a primary synchronization signal (PSS) and secondary synchronization signal (SSS) search. In doing so, the UE may set its receiver (RX) carrier frequency ($F_{c,RX}$) for 0 Hz raster shift. The UE may also estimate a frequency error or offset (e.g., due to inaccuracy of UE's reference clock). The UE may then determine a frequency shift and perform clock refinement or adjustment. Next, the UE may perform physical broadcast channel (PBCH) master information block (MIB) decoding.

For illustrative purposes, one feasible raster shift to allow faster raster scan at each 900 kHz raster spacing without RMSI signaling is 70 kHz. That is, scenario 100 illustrates an example initial cell search process with the raster shift being 70 kHz. It is noteworthy that scenario 100 is provided for illustrative purposes without limiting the scope of the present disclosure. Thus, although certain values (e.g., 70 kHz and 900 kHz) are used in scenario 100, different values may be used in implementing the proposed schemes in accordance with the present disclosure.

Referring to part (B) of FIG. 1, in scenario 100, the UE may determine the frequency error to be 10 ppm, resulting in an error of 26.9 kHz (hence an allowable synchronization raster frequency error range of 53.8 kHz). Accordingly, the UE may set a SSB raster offset frequency to be higher than two times of 26.9 kHz, or no less than 53.8 kHz. In the example shown in FIG. 1, the SSB raster shift is chosen to be 70 kHz.

Illustrative Implementations

FIG. 2 illustrates an example wireless communication system 200 in accordance with an implementation of the present disclosure. Wireless communication system 200 may involve an apparatus 210 and an apparatus 220 wirelessly connected to each other. Each of apparatus 210 and apparatus 220 may perform various functions to implement procedures, schemes, techniques, processes and methods described herein pertaining to synchronization signal block raster shift in mobile communications, including the various procedures, scenarios, schemes, solutions, concepts and techniques described above as well as processes 300 and 400 described below.

Each of apparatus 210 and apparatus 220 may be a part of an electronic apparatus, which may be a UE such as a portable or mobile apparatus, a wearable apparatus, a wireless communication apparatus or a computing apparatus. For instance, each of apparatus 210 and apparatus 220 may be implemented in a smartphone, a smartwatch, a personal digital assistant, a digital camera, or a computing equipment such as a tablet computer, a laptop computer or a notebook computer. Moreover, each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, one or more RISC processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks pertaining to synchronization signal block raster shift in mobile communications in accordance with various implementations of the present disclosure. In some implementations, each of processor 212 and processor 222 may include an electronic circuit with hardware components implementing one or more of the various proposed schemes in accordance with the present disclosure. Alternatively, other than hardware components, each of processor 212 and processor 222 may also utilize software codes and/or instructions in addition to hardware components to implement synchronization signal block raster shift in mobile communications in accordance with various implementations of the present disclosure.

In some implementations, apparatus 210 may also include a transceiver 216 coupled to processor 212 and capable of wirelessly transmitting and receiving data, signals and information. In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 210 may further include a memory 214 coupled to processor 212 and capable of being accessed by processor 212 and storing data therein. In some implementations, apparatus 220 may also include a transceiver 226 coupled to processor 222 and capable of wirelessly transmitting and receiving data, signals and information. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of a mobile communication environment in which apparatus 210 is implemented in or as a UE (e.g., UE in scenario 100) and apparatus 220 is implemented in or as a network node (e.g., gNB or TRP) of a wireless network (e.g., 5G/NR mobile network).

In one aspect, processor 212 of apparatus 210 may perform, via transceiver 216, an initial cell search to identify a cell among one or more cells of a wireless communication system. Additionally, processor 212 may camp, via transceiver 216, on the identified cell (e.g., via apparatus 220 as a network node of the identified cell).

In some implementations, in performing the initial cell search, processor 212 may scan, via transceiver 216, through a plurality of SSB entries that are mathematically expressed as $N*(900 \text{ kHz})+M*(0\text{kHz})+150 \text{ kHz}$. Here, a value of N may range between 1 and 3333, a value of M may be 0 for a SCS spaced channel raster or one of −1, 0 and 1 for a 100 kHz channel raster, and a value of O may be one of 70, 80, 100, 110, 130, 140, 160, 170, 190, 200, 220, 230, 250, 260, 280 and 290.

In some implementations, in scanning through the plurality of SSB entries, processor 212 may scan through a subset of the plurality of SSB entries. The subset of the plurality of SSB entries may be mathematically expressed as $N*(1200 \text{ kHz})+M*(50 \text{ kHz})$. Here, the value of N may range between 1 and 2499, and the value of M may be one of 1, 3 and 5, with the value of M being 3 for SCS spaced channel raster. Moreover, a SSB raster spacing may be 1200 kHz, and a SSB raster offset frequency may be 100 kHz.

In some implementations, in scanning through the plurality of SSB entries, processor 212 may scan through the plurality of SSB entries for frequency bands below 3 GHz for either or both of the SCS spaced channel raster and the 100 kHz channel raster.

In some implementations, a SSB raster offset frequency for the 100 kHz channel raster is a multiple of 30 kHz plus or minus 10 kHz. In some implementations, the SSB raster offset frequency may be 20 kHz, 40 kHz, 50 kHz, 70 kHz, 80 kHz or 100 kHz.

In some implementations, a minimum of the SSB raster offset frequency may be higher than two times of a highest frequency offset of by inaccuracy of a reference clock of apparatus 210. In some implementations, a maximum of the SSB raster offset frequency may be lower than one third of a SSB raster spacing.

In some implementations, the SCS spaced channel raster may include a SCS spaced channel raster with 15 kHz SCS. In some implementations, a minimum channel bandwidth may be 5 MHz or higher.

In some implementations, the SCS spaced channel raster may include a SCS spaced channel raster with 30 kHz SCS. In some implementations, a minimum channel bandwidth may be 10 MHz or higher.

In some implementations, a SSB raster spacing may be a common multiple of 15 kHz and 100 kHz. In some implementations, the SSB raster spacing may be one of 300 kHz, 600 kHz, 900 kHz and 1200 kHz.

In another aspect, processor 212 of apparatus 210 may perform, via transceiver 216, an initial cell search to identify a cell among one or more cells of a wireless communication system. Moreover, processor 212 may camp, via transceiver 216, on the identified cell (e.g., via apparatus 220 as a network node of the identified cell).

In some implementations, in performing the initial cell search, processor 212 may scan, via transceiver 216, through a plurality of SSB entries for frequency bands below 3 GHz with a SSB raster spacing and a SSB raster offset frequency satisfying a plurality of requirements including: (a) support for both a SCS spaced channel raster and a 100 kHz channel raster, (b) support for both 15 kHz SCS and 30 kHz SCS, (c) a minimum channel bandwidth (CBW) at 5 MHz or higher for 15 kHz SCS or at 10 MHz or higher for 30 kHz SCS, (d) the SSB raster spacing being a common multiple of 15 kHz and 100 kHz, and (e) the SSB raster offset frequency for the 100 kHz channel raster being a multiple of 30 kHz plus or minus 10 kHz.

In some implementations, the plurality of SSB entries may be mathematically expressed as N*(900 kHz)+M*(OkHz)+150 kHz. Here, a value of N may range between 1 and 3333, a value of M may be 0 for a SCS spaced channel raster or one of −1, 0 and 1 for a 100 kHz channel raster, and a value of O may be one of 70, 80, 100, 110, 130, 140, 160, 170, 190, 200, 220, 230, 250, 260, 280 and 290.

In some implementations, the plurality of SSB entries may be mathematically expressed as N*(1200 kHz)+M*(50 kHz). Here, the value of N may range between 1 and 2499, and the value of M may be one of 1, 3 and 5, with the value of M being 3 for SCS spaced channel raster. Moreover, the SSB raster spacing may be 1200 kHz, and the SSB raster offset frequency may be 100 kHz.

In some implementations, a minimum of the SSB raster offset frequency may be higher than two times of a highest frequency offset of by inaccuracy of a reference clock of apparatus 210. In some implementations, a maximum of the SSB raster offset frequency may be lower than one third of the SSB raster spacing.

Illustrative Processes

FIG. 3 illustrates an example process 300 in accordance with an implementation of the present disclosure. Process 300 may be an example implementation of the various procedures, scenarios, schemes, solutions, concepts and techniques, or a combination thereof, whether partially or completely, with respect to synchronization signal block raster shift in mobile communications in accordance with the present disclosure. Process 300 may represent an aspect of implementation of features of apparatus 210 and/or apparatus 220. Process 300 may include one or more operations, actions, or functions as illustrated by one or more of blocks 310 and 320 as well as sub-block 315. Although illustrated as discrete blocks, various blocks of process 300 may be divided into additional blocks, combined into fewer blocks, or eliminated, depending on the desired implementation. Moreover, the blocks of process 300 may be executed in the order shown in FIG. 3 or, alternatively, in a different order. Furthermore, one or more of the blocks of process 300 may be repeated one or more times. Process 300 may be implemented by apparatus 210 or any suitable UE or machine type devices. Solely for illustrative purposes and without limitation, process 300 is described below in the context of apparatus 210 as a UE and apparatus 220 as a network node (e.g., gNB or TRP) of a cell of a wireless communication system (e.g., 5G NR mobile communication system). Process 300 may begin at block 310.

At 310, process 300 may involve processor 212 of apparatus 210 performing, via transceiver 216, an initial cell search to identify a cell among one or more cells of a wireless communication system. Process 300 may proceed from 310 to 320.

At 320, process 300 may involve processor 212 camping, via transceiver 216, on the identified cell (e.g., via apparatus 220 as a network node of the identified cell).

At 315, in performing the initial cell search, process 300 may involve processor 212 scanning, via transceiver 216, through a plurality of SSB entries that are mathematically expressed as N*(900 kHz)+M*(OkHz)+150 kHz. Here, a value of N may range between 1 and 3333, a value of M may be 0 for a SCS spaced channel raster or one of −1, 0 and 1 for a 100 kHz channel raster, and a value of O may be one of 70, 80, 100, 110, 130, 140, 160, 170, 190, 200, 220, 230, 250, 260, 280 and 290.

In some implementations, in scanning through the plurality of SSB entries, process 300 may involve processor 212 scanning through a subset of the plurality of SSB entries. The subset of the plurality of SSB entries may be mathematically expressed as N*(1200 kHz)+M*(50 kHz). Here, the value of N may range between 1 and 2499, and the value of M may be one of 1, 3 and 5, with the value of M being 3 for SCS spaced channel raster. Moreover, a SSB raster spacing may be 1200 kHz, and a SSB raster offset frequency may be 100 kHz.

In some implementations, in scanning through the plurality of SSB entries, process 300 may involve processor 212 scanning through the plurality of SSB entries for frequency bands below 3 GHz for either or both of the SCS spaced channel raster and the 100 kHz channel raster.

In some implementations, a SSB raster offset frequency for the 100 kHz channel raster is a multiple of 30 kHz plus or minus 10 kHz. In some implementations, the SSB raster offset frequency may be 20 kHz, 40 kHz, 50 kHz, 70 kHz, 80 kHz or 100 kHz.

In some implementations, a minimum of the SSB raster offset frequency may be higher than two times of a highest frequency offset of by inaccuracy of a reference clock of apparatus 210. In some implementations, a maximum of the SSB raster offset frequency may be lower than one third of a SSB raster spacing.

In some implementations, the SCS spaced channel raster may include a SCS spaced channel raster with 15 kHz SCS. In some implementations, a minimum channel bandwidth may be 5 MHz or higher.

In some implementations, the SCS spaced channel raster may include a SCS spaced channel raster with 30 kHz SCS. In some implementations, a minimum channel bandwidth may be 10 MHz or higher.

In some implementations, a SSB raster spacing may be a common multiple of 15 kHz and 100 kHz. In some implementations, the SSB raster spacing may be one of 300 kHz, 600 kHz, 900 kHz and 1200 kHz.

FIG. 4 illustrates an example process 400 in accordance with an implementation of the present disclosure. Process 400 may be an example implementation of the various procedures, scenarios, schemes, solutions, concepts and techniques, or a combination thereof, whether partially or completely, with respect to synchronization signal block raster shift in mobile communications in accordance with the present disclosure. Process 400 may represent an aspect of implementation of features of apparatus 210 and/or apparatus 220. Process 400 may include one or more operations, actions, or functions as illustrated by one or more of blocks 410 and 420 as well as sub-block 415. Although illustrated as discrete blocks, various blocks of process 400 may be divided into additional blocks, combined into fewer blocks, or eliminated, depending on the desired implementation. Moreover, the blocks of process 400 may be executed in the order shown in FIG. 4 or, alternatively, in a different order. Furthermore, one or more of the blocks of process 400 may be repeated one or more times. Process 400 may be implemented by apparatus 210 or any suitable UE or machine type devices. Solely for illustrative purposes and without limitation, process 400 is described below in the context of apparatus 210 as a UE and apparatus 220 as a network node (e.g., gNB or TRP) of a cell of a wireless communication system (e.g., 5G NR mobile communication system). Process 400 may begin at block 410.

At 410, process 400 may involve processor 212 of apparatus 210 performing, via transceiver 216, an initial cell search to identify a cell among one or more cells of a wireless communication system. Process 400 may proceed from 410 to 420.

At 420, process 400 may involve processor 212 camping, via transceiver 216, on the identified cell (e.g., via apparatus 220 as a network node of the identified cell).

At 415, in performing the initial cell search, process 300 may involve processor 212 scanning, via transceiver 216, through a plurality of SSB entries for frequency bands below 3 GHz with a SSB raster spacing and a SSB raster offset frequency satisfying a plurality of requirements including: (a) support for both a SCS spaced channel raster and a 100 kHz channel raster, (b) support for both 15 kHz SCS and 30 kHz SCS, (c) a minimum channel bandwidth (CBW) at 5 MHz or higher for 15 kHz SCS or at 10 MHz or higher for 30 kHz SCS, (d) the SSB raster spacing being a common multiple of 15 kHz and 100 kHz, and (e) the SSB raster offset frequency for the 100 kHz channel raster being a multiple of 30 kHz plus or minus 10 kHz.

In some implementations, the plurality of SSB entries may be mathematically expressed as $N*(900$ kHz$)+M*$ (OkHz)$+150$ kHz. Here, a value of N may range between 1 and 3333, a value of M may be 0 for a SCS spaced channel raster or one of $-1, 0$ and 1 for a 100 kHz channel raster, and a value of O may be one of 70, 80, 100, 110, 130, 140, 160, 170, 190, 200, 220, 230, 250, 260, 280 and 290.

In some implementations, the plurality of SSB entries may be mathematically expressed as $N*(1200$ kHz$)+M*(50$ kHz$)$. Here, the value of N may range between 1 and 2499, and the value of M may be one of 1, 3 and 5, with the value of M being 3 for SCS spaced channel raster. Moreover, the SSB raster spacing may be 1200 kHz, and the SSB raster offset frequency may be 100 kHz.

In some implementations, a minimum of the SSB raster offset frequency may be higher than two times of a highest frequency offset of by inaccuracy of a reference clock of apparatus 210. In some implementations, a maximum of the SSB raster offset frequency may be lower than one third of the SSB raster spacing.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   performing, by a processor of a user equipment (UE), an initial cell search to identify a cell among one or more cells of a wireless communication system; and
   camping, by the processor, on the identified cell,
   wherein the performing of the initial cell search comprises scanning through a plurality of synchronization signal block (SSB) entries with a SSB raster spacing being a common multiple of 15 kHz and 100 kHz, the plurality of SSB entries that are mathematically expressed as:

$N*(1200 \text{ kHz})+M*(50 \text{ kHz})$ wherein a value of N ranges between 1 and 2499, and wherein the value of M is one of 1, 3 and 5, with the value of M being 3 for SCS spaced channel raster.

2. The method of claim 1, wherein a SSB raster spacing is 1200 kHz, and wherein a SSB raster offset frequency is 100 kHz.

3. The method of claim 1, wherein the scanning through the plurality of SSB entries comprises scanning through the plurality of SSB entries for frequency bands below 3 GHz for either or both of the SCS spaced channel raster and the 100 kHz channel raster.

4. The method of claim 1, wherein a SSB raster offset frequency for the 100 kHz channel raster is a multiple of 30 kHz plus or minus 10 kHz.

5. The method of claim 4, wherein the SSB raster offset frequency is 20 kHz, 40 kHz, 50 kHz, 70 kHz, 80 kHz or 100 kHz.

6. The method of claim 4, wherein a minimum of the SSB raster offset frequency is higher than two times of a highest frequency offset of by inaccuracy of a reference clock of the UE.

7. The method of claim 4, wherein a maximum of the SSB raster offset frequency is lower than one third of a SSB raster spacing.

8. The method of claim 1, wherein the SCS spaced channel raster comprises a SCS spaced channel raster with 15 kHz SCS.

9. The method of claim 8, wherein a minimum channel bandwidth is 5 MHz or higher.

10. The method of claim 1, wherein the SCS spaced channel raster comprises a SCS spaced channel raster with 30 kHz SCS.

11. The method of claim 10, wherein a minimum channel bandwidth is 10 MHz or higher.

12. The method of claim 1, wherein the SSB raster spacing is one of 300 kHz, 600 kHz, 900 kHz and 1200 kHz.

13. An apparatus, comprising:
    a transceiver configured to wirelessly communicate with one or more cells of a wireless communication system; and
    a processor coupled to the transceiver and configured to perform operations comprising:
       performing, via the transceiver, an initial cell search to identify a cell among the one or more cells of the wireless communication system; and
       camping, via the transceiver, on the identified cell,
    wherein, in performing the initial cell search, the processor scans through a plurality of synchronization signal block (SSB) entries with a SSB raster spacing being a common multiple of 15 kHz and 100 kHz, the plurality of SSB entries are mathematically expressed as:

$N*(1200 \text{ kHz})+M*(50 \text{ kHz})$ wherein a value of N ranges between 1 and 2499, and wherein the value of M is one of 1, 3 and 5, with the value of M being 3 for SCS spaced channel raster.

14. The apparatus of claim 13, wherein a SSB raster spacing is 1200 kHz, and wherein a SSB raster offset frequency is 100 kHz.

15. The apparatus of claim 13, wherein a SSB raster offset frequency for the 100 kHz channel raster is a multiple of 30 kHz plus or minus 10 kHz, and wherein a maximum of the SSB raster offset frequency is lower than one third of a SSB raster spacing.

16. The apparatus of claim 13, wherein the SCS spaced channel raster comprises a SCS spaced channel raster with 15 kHz SCS, and wherein a minimum channel bandwidth is 5 MHz or higher.

17. The apparatus of claim 13, wherein the SSB raster spacing is one of 300 kHz, 600 kHz, 900 kHz and 1200 kHz.

* * * * *